US012657764B2

(12) United States Patent (10) Patent No.: US 12,657,764 B2
Schönberger et al. (45) Date of Patent: Jun. 16, 2026

(54) MATCHING BETWEEN 2D AND 3D FOR DIRECT LOCALIZATION

(71) Applicant: Microsoft Technology Licensing, LLC, Redmond, WA (US)

(72) Inventors: Johannes Lutz Schönberger, Zurich (CH); Rui Wang, Zurich (CH); Prune Solange Garance Truong, Zurich (CH); Marc André Léon Pollefeys, Zurich (CH)

(73) Assignee: Microsoft Technology Licensing, LLC., Redmond, WA (US)

( * ) Notice: Subject to any disclaimer, the term of this patent is extended or adjusted under 35 U.S.C. 154(b) by 577 days.

(21) Appl. No.: 18/055,722

(22) Filed: Nov. 15, 2022

(65) Prior Publication Data

US 2024/0161337 A1 May 16, 2024

(51) Int. Cl.
$$\begin{array}{ll} \textbf{\textit{G06T 7/73}} & (2017.01) \\ \textbf{\textit{G06F 16/535}} & (2019.01) \\ \textbf{\textit{G06V 20/64}} & (2022.01) \end{array}$$

(52) U.S. Cl.
CPC .............. *G06T 7/74* (2017.01); *G06F 16/535* (2019.01); *G06V 20/647* (2022.01); *G06T 2207/10024* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 9,251,417 B1 * | 2/2016 | Xu | ......................... | G06V 20/647 |
| 9,633,483 B1 * | 4/2017 | Xu | ........................... | G06F 18/24 |
| 11,189,049 B1 * | 11/2021 | Chakravarty | ............ | G06T 7/70 |
| 11,704,841 B2 * | 7/2023 | Mashita | ................... | G06N 3/08 |
| 12,377,549 B2 * | 8/2025 | Moreno Noguer | .... | B25J 9/1697 |
| 2018/0158235 A1 * | 6/2018 | Wu | .......................... | G06T 19/20 |

(Continued)

FOREIGN PATENT DOCUMENTS

CN        114882106 A        8/2022

OTHER PUBLICATIONS

Aiello E, Valsesia D, Magli E. Cross-modal Learning for Image-Guided Point Cloud Shape Completion. InAdvances in Neural Information Processing Systems Oct. 31, 2022. (Year: 2022).*

(Continued)

*Primary Examiner* — Michelle M Entezari Hausmann
(74) *Attorney, Agent, or Firm* — Barta Jones, PLLC

(57) ABSTRACT

Determining a location of an entity comprises: receiving a query comprising a 2D image depicting an environment of the entity; searching for a match between the query and a 3D map of the environment. The 3D map comprising a 3D point cloud, the match indicating the location of the entity in the environment. Searching for the match comprises: extracting descriptors from the 2D image referred to as image descriptors; extracting descriptors from the 3D point cloud referred to as point cloud descriptors; correlating the image descriptors with the point cloud descriptors to produce correspondences, wherein a correspondence is an image descriptor corresponding to a point cloud descriptor; estimating, using the correspondences, the location of the entity.

20 Claims, 8 Drawing Sheets

(56) References Cited

U.S. PATENT DOCUMENTS

| | | | |
|---|---|---|---|
| 2019/0206116 A1* | 7/2019 | Xu | G06T 15/205 |
| 2021/0335033 A1* | 10/2021 | Meng | G06T 17/00 |
| 2022/0351465 A1* | 11/2022 | Pantpratinidhi | G06T 7/73 |
| 2023/0126333 A1* | 4/2023 | Ali | G01S 7/403 |
| | | | 701/25 |
| 2023/0298307 A1* | 9/2023 | Mao | G06V 10/751 |
| | | | 382/155 |
| 2024/0029295 A1* | 1/2024 | You | G06T 7/246 |
| 2024/0265657 A1* | 8/2024 | Pei | G06V 10/764 |
| 2025/0052590 A1* | 2/2025 | Yoshida | G01C 21/3819 |
| 2025/0316036 A1* | 10/2025 | Evangelidis | G06F 3/0304 |

OTHER PUBLICATIONS

Yun P, Tai L, Wang Y, Liu C, Liu M. Focal loss in 3d object detection. IEEE Robotics and Automation Letters. Jan. 23, 2019;4(2):1263-70. (Year: 2019).*

Zhao C, Yang J, Xiong X, Zhu A, Cao Z, Li X. Rotation invariant point cloud analysis: Where local geometry meets global topology. Pattern Recognition. Jul. 1, 2022;127:108626. (Year: 2022).*

Shi C, Wang C, Liu X, Sun S, Xiao B, Li X, Li G. Three-dimensional point cloud denoising via a gravitational feature function. Applied Optics. Feb. 10, 2022;61(6):1331-43. (Year: 2022).*

Kim J, Choi C, Jang H, Kim YM. Piccolo: Point cloud-centric omnidirectional localization. InProceedings of the IEEE/CVF International Conference on Computer Vision 2021 (pp. 3313-3323). (Year: 2021).*

Li, Minhao, et al. "2d3d-matr: 2d-3d matching transformer for detection-free registration between images and point clouds." Proceedings of the IEEE/CVF International Conference on Computer Vision. 2023. (Year: 2023).*

Dong, Chuanxiang, et al. "A Novel Point Cloud Coarse Registration Method Combining 2D image information." 2023 International Conference on Image Processing, Computer Vision and Machine Learning (ICICML). IEEE, 2023. (Year: 2023).*

Feng, et al., "2D3D-Matchnet: Learning to Match Keypoints Across 2D Image and 3D Point Cloud" 2019 International Conference on Robotics and Automation, IEEE, May 20, 2019, pp. 4790-4796.

International Search Report and Written Opinion received for PCT Application No. PCT/US23/033800, Feb. 7, 2024, 18 pages.

Pham, et al., "LCD: Learned Cross-Domain Descriptors for 2D-3D Matching" Proceedings of the AAAI Conference on Artificial Intelligence, vol. 34, Issue 07, Nov. 21, 2019, pp. 11856-11864.

Wang, et al., "P2-Net: Joint Description and Detection of Local Features for Pixel and Point Matching", IEEE/CVF International Conference on Computer Vision (ICCV), Oct. 10, 2021, pp. 16004-16013.

Yu, et al., "CoFiNet: Reliable Coarse-to-fine Correspondences for Robust Point Cloud Registration", Oct. 26, 2021, pp. 1-13.

Zeng, et al., "3DMatch: Learning Local Geometric Descriptors From RGB-D Reconstructions", Proceedings of the IEEE Conference on Computer Vision and Pattern Recognition (CVPR), Jul. 21, 2017, pp. 1802-1811.

Campbell, et al., "Solving the Blind Perspective-n-Point Problem End-to-End with Robust Differentiable Geometric Optimization", In Proceedings of 16th European Conference on Computer Vision, Aug. 23, 2020, pp. 244-261.

Dai, et al., "ScanNet: Richly-Annotated 3D Reconstructions of Indoor Scenes", In Proceedings of Conference on Computer Vision and Pattern Recognition, Jul. 21, 2017, pp. 2432-2443.

Feng, et al., "2D3D-Matchnet: Learning to Match Keypoints Across 2D Image and 3D Point Cloud", In Proceedings of International Conference on Robotics and Automation, May 20, 2019, pp. 4790-4796.

Li, et al., "DeepI2P: Image-to-Point Cloud Registration via Deep Classification", In Proceedings of Conference on Computer Vision and Pattern Recognition, Jun. 19, 2021, pp. 15960-15969.

Li, et al., "MegaDepth: Learning Single-View Depth Prediction from Internet Photos", In Proceedings of Conference on Computer Vision and Pattern Recognition, Jun. 18, 2018, pp. 2041-2050.

Liu, et al., "Learning 2D-3D Correspondences to Solve The Blind Perspective-n-Point Problem", In Repository of arXiv:2003.06752v1, Mar. 15, 2020, 23 Pages.

Pham, et al., "LCD: Learned Cross-Domain Descriptors for 2D-3D Matching", In Proceedings of the Thirty-Fourth AAAI Conference on Artificial Intelligence, vol. 34, Issue 7, Apr. 3, 2020, pp. 11856-11864.

Schonberger, et al., "Structure-from-Motion Revisited", In Proceedings of Conference on Computer Vision and Pattern Recognition, Jun. 27, 2016, pp. 4104-4113.

Wang, et al., "P2-Net: Joint Description and Detection of Local Features for Pixel and Point Matching", In Proceedings of International Conference on Computer Vision, Oct. 10, 2021, pp. 15984-15993.

Zhou, et al., "Is Geometry Enough for Matching in Visual Localization?", In Repository of arXiv:2203.12979v1, Mar. 24, 2022, 16 Pages.

International preliminary report on patentability Received in European Patent Application No. PCT/US23/033800, mailed on May 22, 2025, 13 pages.

* cited by examiner

200

202

MATCHING BETWEEN 2D AND 3D FOR DIRECT LOCALIZATION

BACKGROUND

Localization is a process whereby sensor data is used to find a 3D pose of an entity in an environment with respect to a 3D map of the environment. Localization is used in a large range of applications and a non-exhaustive list of example applications is: navigation, hologram sharing and persistence, virtual reality, augmented reality, robotics, constructing digital twins of buildings or other environments.

The embodiments described below are not limited to implementations which solve any or all of the disadvantages of known processes for localization.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples it is possible to directly match from 2D visual images to 3D point-clouds in order to achieve localization with respect to a 3D map. In this way the 3D map may be constructed from 3D scanning and without the map containing visual imagery of the environment.

In various examples there is a method of determining a 3D position and orientation of an entity comprising: receiving a query comprising a 2D image depicting an environment of the entity; searching for a match between the query and a 3D map of the environment. The 3D map comprises a 3D point cloud. Searching for the match comprises: extracting descriptors from the 2D image referred to as image descriptors; extracting descriptors from the 3D point cloud referred to as point cloud descriptors; correlating the image descriptors with the point cloud descriptors to produce correspondences, wherein a correspondence is an image descriptor corresponding to a point cloud descriptor; estimating, using the correspondences, the 3D position and orientation of the entity with respect to the 3D map.

In various examples it is possible to directly match from a 3D point cloud to a 3D map formed from 2D images. In this way it is possible to use a depth image such as a time of flight camera image, a 3D scan or other data forming a 3D point cloud to localize an entity. This is useful where an entity does not have a sensor for capturing 2D images of its environment and only has a depth sensor such as a time of flight camera or other depth sensor. For example, there are methods of receiving a query comprising a 3D point cloud depicting an environment of the entity. The methods search for a match between the query and a 3D map of the environment, the 3D map comprising 2D images. Searching for the match comprises: extracting descriptors from the 3D point cloud referred to as point cloud descriptors; extracting descriptors from the 2D images referred to as image descriptors; correlating the image descriptors with the point cloud descriptors to produce correspondences, wherein a correspondence is an image descriptor corresponding to a point cloud descriptor; and estimating, using the correspondences, the position and orientation of the entity with respect to the 3D map.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
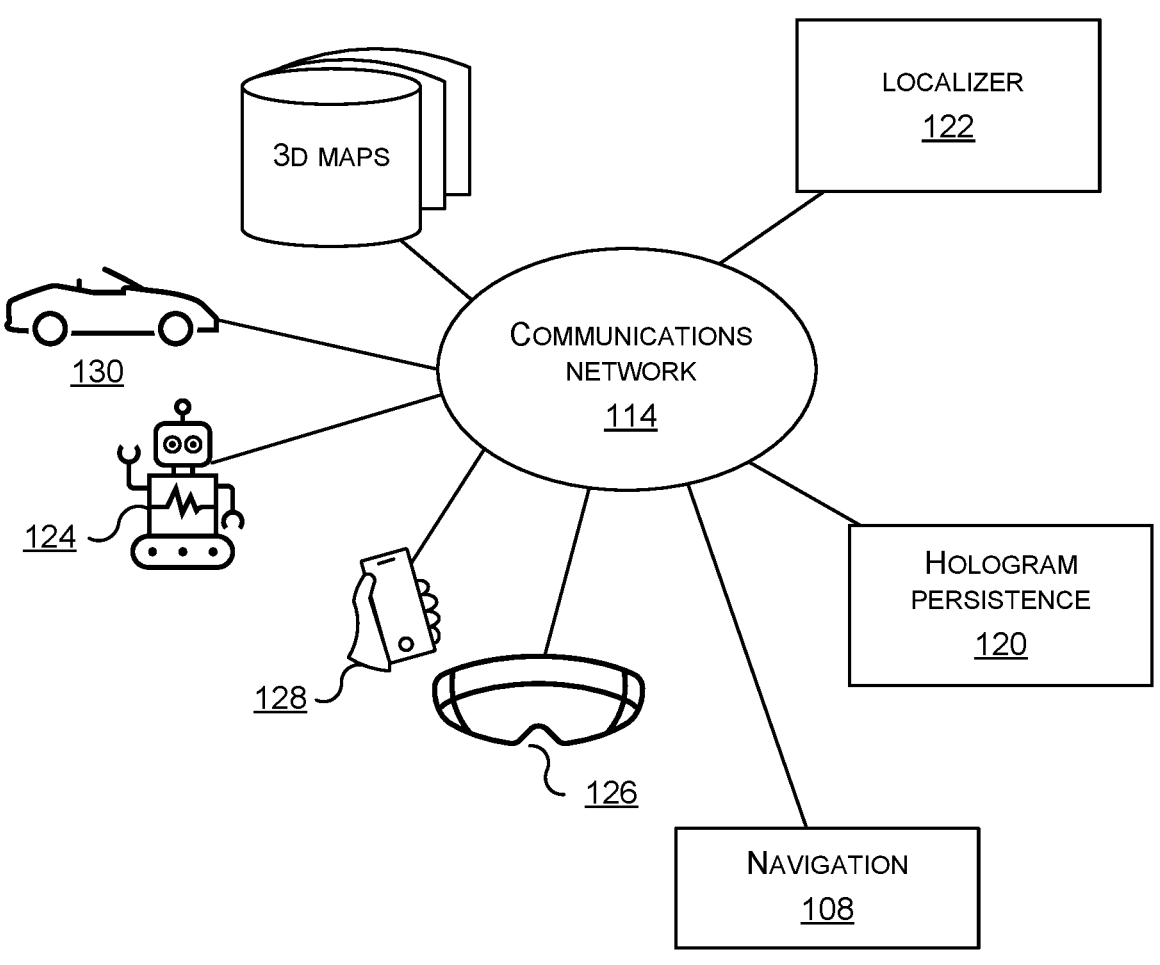
FIG. 1 is a schematic diagram of a localizer for localizing entities with respect to 3D maps.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Various types of 3D map are available including 3D point clouds of a scene which contain no visual imagery of the environment; and 3D point clouds which have been created from a set of reference images and so do contain visual imagery of the environment.

In the case where a 3D point-cloud is created from a set of reference images, this is done by establishing matches between the reference images to estimate their relative poses and triangulate a 3D model which is the 3D map. In order to determine the 3D location of an entity (such as a robot) in an environment depicted in the 3D map, the entity captures an image referred to as a query image. The query image may be matched to the reference images of the map to find correspondences where a correspondence is a query image pixel and a reference image pixel which depict the same element in the environment. The correspondences are between 2D pixels in the query image and 2D pixels in the reference images. These 2D-2D correspondences are then lifted to 3D2D matches and fed to a PnP solver to estimate the pose of the query image with respect to the 3D map. The term "pose" refers to a 3D position and orientation. Thus estimating the pose of the query image is estimating a pose of the entity which captured the query image i.e. the 3D position and orientation of the entity with respect to the 3D map. Any commercially available PnP solver is used, where a PnP solver is functionality for computing a 3D position and orientation from a plurality of correspondences between 3D points and 2D points.

The inventors have recognized several limitations with 3D maps created from reference images and using such 3D maps. First and foremost, this approach requires visual images as input for both the mapping and query steps. However, there are typically security risks introduced by using visual images of an environment since a malicious party gaining access to the visual images gains information about the environment which can be exploited (such as to gain unauthorized access to a premises). Where 3D maps are created from reference images the reference images are typically stored with the 3D map itself and are thus potentially accessible to many parties using the 3D maps.

Another limitation concerns accuracy, since 3D maps created from reference images are not as accurate as 3D maps created from active 3D scanning (e.g., lidar, radar, structured light, time-of-light, etc.) that directly produce a 3D point-cloud of the scene but contain no visual imagery of the environment. Active depth scanners typically achieve superior 3D map accuracy than image-based reconstruction approaches based on (multi-view) triangulation. Furthermore, visual appearance changes drastically with illumination or temporal changes and poses significant challenge for matching across such changes between query and map.

In various examples these limitations are ameliorated by enabling to directly match from 2D visual images to 3D point-clouds. As such, visual data is not needed as input for building 3D maps. Novel scenarios are enabled, where for example a phone can directly localize against a 3D lidar scan. Leveraging active depth scanners for mapping also provides the opportunity to reach higher localization accuracy due to possibly more accurate 3D maps, as well as higher localization recall due to increased robustness of a 3D map representation against illumination changes. The technology gives more security since visual images are not stored as part of the 3D map.

FIG. 1 is a schematic diagram of a localizer 122 for computing the 3D position and orientation of an entity with respect to a 3D map. FIG. 1 shows various examples of entities including self-driving car 130, robot 124, smart phone 128, head worn computer 126 and other entities are possible. Each entity has a capture device for capturing 2D images of an environment of the entity. One of the 2D images is sent to the localizer 122 via communications network 114 which is able suitable communications network such as the Internet, an intranet, or other communications network. The 2D image may be encrypted and/or compressed before sending. The localizer receives the 2D image as a query for querying a 3D map. The localizer has access to one or more 3D maps 106 via communications network 114 or from a store at the localizer 122 itself. The 3D maps are 3D point clouds depicting environments of the entities. The localizer queries one or more 3D maps using the 2D image to directly localize the entity with respect to the 3D map or maps. Directly localizing means that the localizing is achieved by searching for correspondences between the 2D image and the 3D point cloud. The localizer 122 produces as output a pose of the entity which sent the query image. In some cases, the localizer returns the pose to the entity which sent the query image. In some cases the localizer send the pose to an application such as a hologram persistence application 120, a navigation application 108, or other application. In the case of the hologram persistence application the pose may be the pose of a person wearing a head worn computer 126 and is used to persist a hologram depicting the person as part of a conference call. In the case of the navigation application 108, the pose may be the pose of the self-driving car 130 and is used to control movement of the self-driving car towards a destination.

In the example of FIG. 1 the localizer 122 is deployed in the cloud or at a computing entity remote from the entities. However, the functionality of the localizer 122 may be deployed at an entity. In some cases the functionality of the localizer 122 is shared between an entity and another computing device, such as a companion computing device, a cloud server, any remote computing device.

In some embodiments, the localizer 122 receives a query from an entity where the query is a 3D point cloud rather than a 2D image. This is useful where the entity 124, 126, 128, 130 does not have a capture device for capturing 2D images but does have a capture device for capturing 3D point clouds. The localizer 122 receives a query which is a 3D point cloud and searches for a match between the query and a 3D map of the environment of the entity. The 3D map in this case comprises 2D images. The 2D images are posed 2D images; that is, for each 2D image the 3D position and orientation of a capture device used to capture the 2D image has been computed.

The localizer's ability to match between a query and a 3D map of an environment enables the localizer to operate in an unconventional manner to achieve more accurate and secure localization of an entity The localizer benefits the functioning of an underlying computing device by correlating image descriptors with point cloud descriptors.

Alternatively, or in addition, the functionality of the localizer 122 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
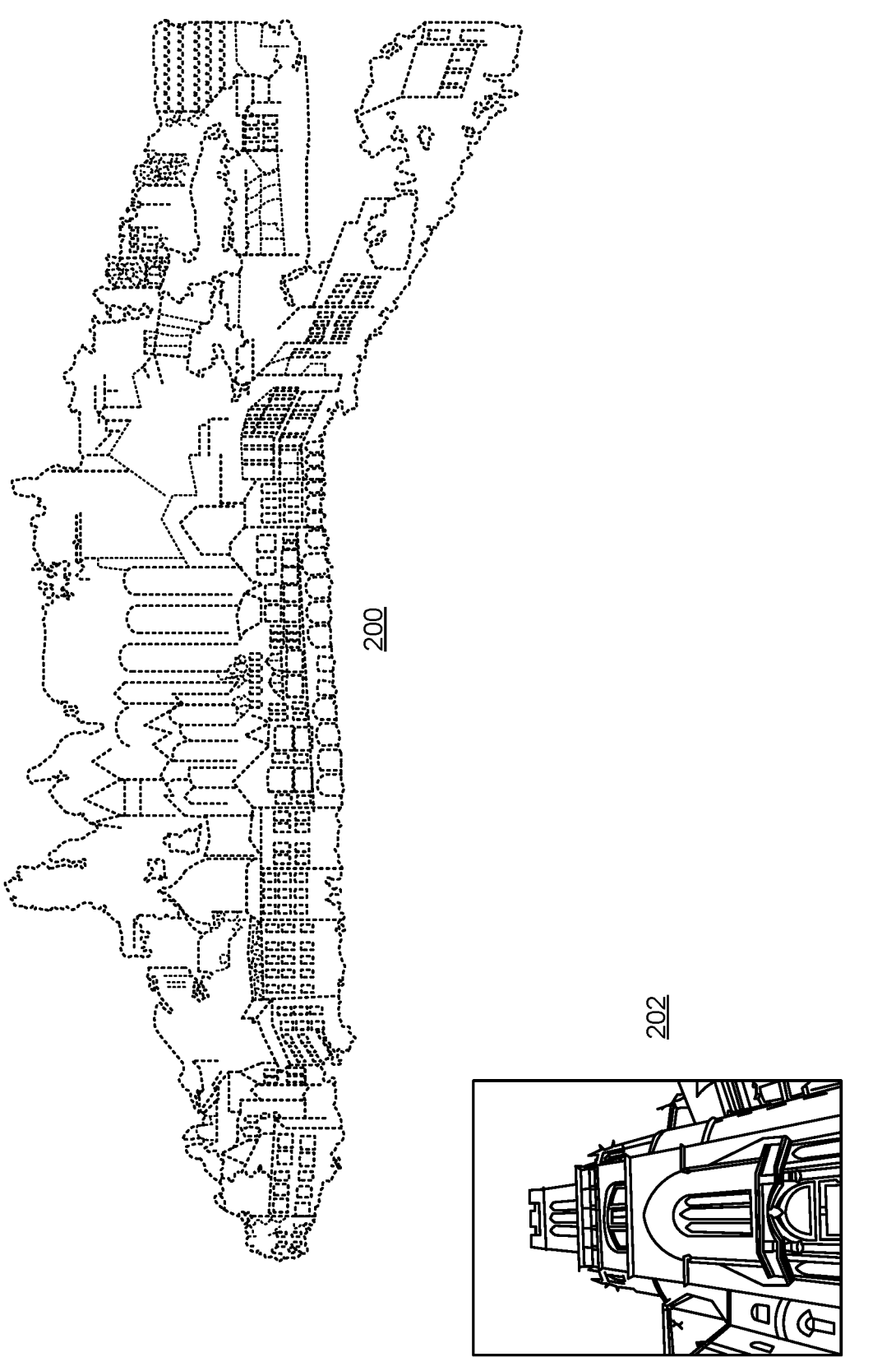
FIG. 2 is a schematic diagram of a 3D map formed from 3D scanning data and without the map containing visual imagery of the environment.

FIG. 2 is a schematic diagram of a 3D map 200 which is a 3D point cloud. The 3D map in FIG. 2 is of a city comprising buildings, streets and a cathedral. The 3D map of FIG. 2 has been constructed by using one or more 3D scanners (e.g., lidar, radar, structured light, time-of-light, etc.) that directly produce a 3D point-cloud of the scene but contain no visual imagery of the environment. The 3D point-cloud may be colorized by images of the environment. FIG. 2 also schematically shows a query image 202 captured by an entity in the environment and to be used by the localizer 122 to compute a 3D position and orientation of the entity with respect to the 3D map.

Figure 3:
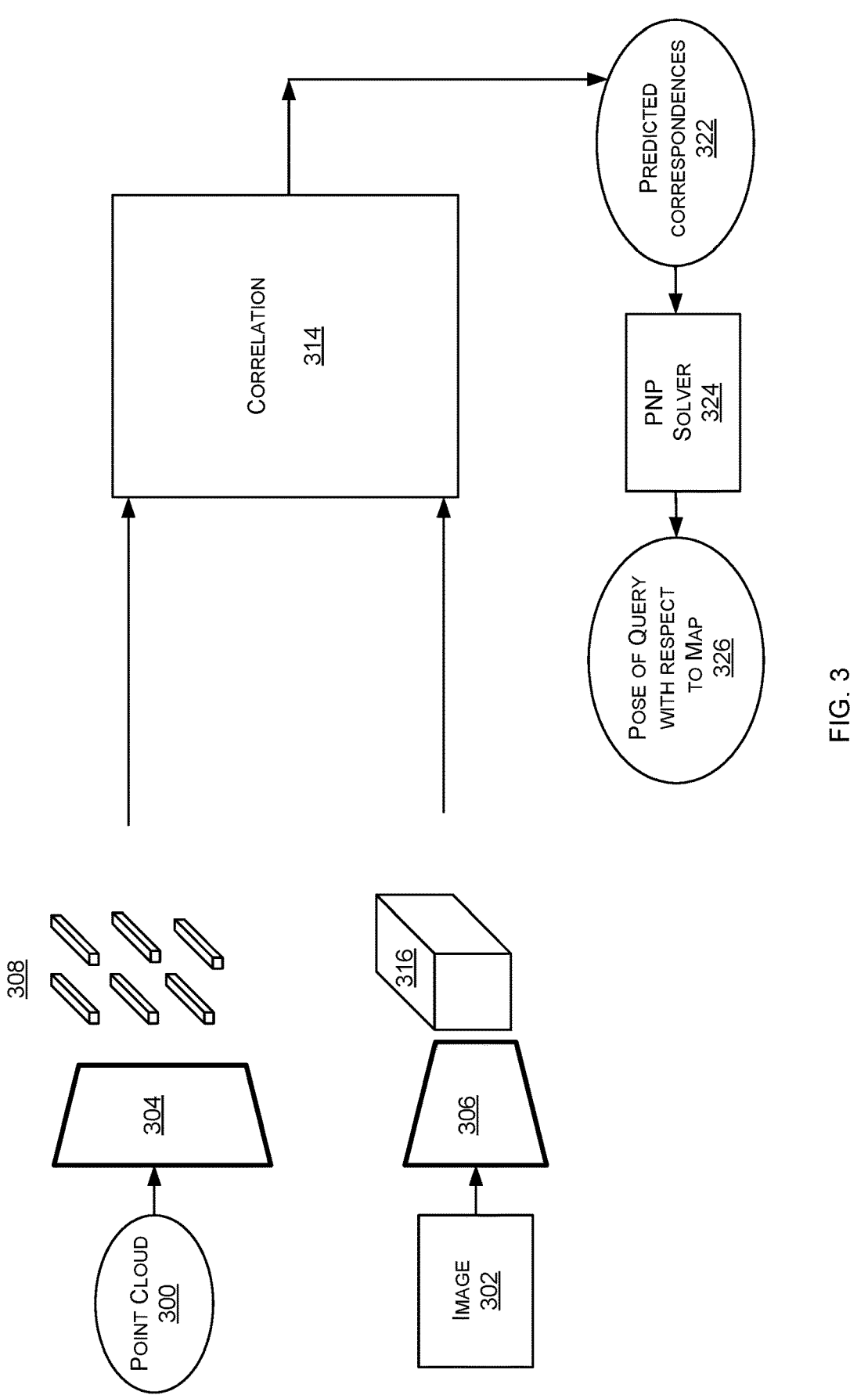
FIG. 3 is a schematic diagram of a localizer.

FIG. 3 is an example of a localizer 122 in more detail. The localizer 122 comprises a first extractor 304 for extracting descriptors from a 3D point cloud 300. The extracted descriptors are referred to herein as point cloud descriptors 308. The 3D point cloud 300 is a 3D map 106, 200 or part of a 3D map. The extractor 304 is any functionality for extracting descriptors from a point cloud, such as a feature detector. In some cases the extractor 304 convolves the point cloud with a kernel to detect descriptors such as blobs, edges, surfaces or other features. In some cases the extractor 304 uses template matching to detect descriptors in the point cloud. In some cases the extractor 304 is a trained machine learning model.

The localizer 122 comprises a second extractor 306 for extracting descriptors from an image 302. The extracted descriptors are referred to herein as image descriptors 316. The image 302 is a 2D image captured by a capture device such as a red green blue camera, a web camera, a smart phone camera, a video camera or other camera. The second extractor 306 is any functionality for extracting descriptors from an image, such as a feature detector. In some cases the second extractor 306 convolves the image 302 with a kernel to detect descriptors such as blobs, edges, discontinuities or other features. In some cases the second extractor 306 uses template matching to detect descriptors in the image 302. In some cases the second extractor 306 is a trained machine learning model.

As indicated in FIG. 3 the first and second extractors 304, 306 may operate in parallel to improve efficiency.

The point cloud descriptors 308 and the image descriptors 302 are input to a correlation 314 process. The correlation process computes a similarity between the point cloud descriptors 308 and the image descriptors 316. In an example, for each image descriptor, a similarity is computed with each of the point cloud descriptors 308. The similarity is computed using any similarity metric. Thus, for a pair comprising an image descriptor and a point cloud descriptor a numerical similarity value is computed. Image descriptor-point cloud descriptor pairs which have similarity values above a threshold are selected. Each pair is referred to as a correspondence since it is likely the descriptors are both depicting the same element in the environment. The selected pairs are correspondences 322 predicted by the correlation process and are input to a perspective n point (PnP) solver 324. The PnP solver uses the predicted correspondences to compute a pose of the entity with respect to the map, where the point cloud 300 is part of, or is the map. Any available PnP solver may be used such as solvePnP (trade mark) of OpenCV (trade mark).

By using the descriptor extractors and the correlation process it is found that an effective and accurate way of localizing an entity with respect to a 3D map is given. The 3D map does not need to have associated 2D images; that is there is no need to match a query image to a reference image of a 3D map. There is improved accuracy since the 3D map itself may be formed from 3D scan data rather than from reference images.

Alternative approaches seek to detect and describe features in both the point cloud and the image. However, detecting repeatable points across two different modalities is extremely challenging, severely affecting the matching performance. In contrast, the present technology does not rely on any detection step and is therefore more widely applicable to challenging scenarios, such as homogeneous regions.

The localizer of FIG. 3 is operable without having an initial pose of the entity in contrast to alternative approaches.

The localizer of FIG. 3 is operable in some embodiments to estimate the 3D position and orientation of an entity from a 3D point cloud captured by the entity. In these embodiments the point cloud 300 has been captured by the entity and the image 302 is an image of the 3D map. That is, the 3D map in these embodiments comprises a plurality of 2D images. The 2D images are posed, that is, for each 2D image a 3D position and orientation of a capture device used to capture the 2D image has been computed. The localizer outputs a pose of the query (which in this case is a 3D point cloud) with respect to the 3D map.

Figure 4:
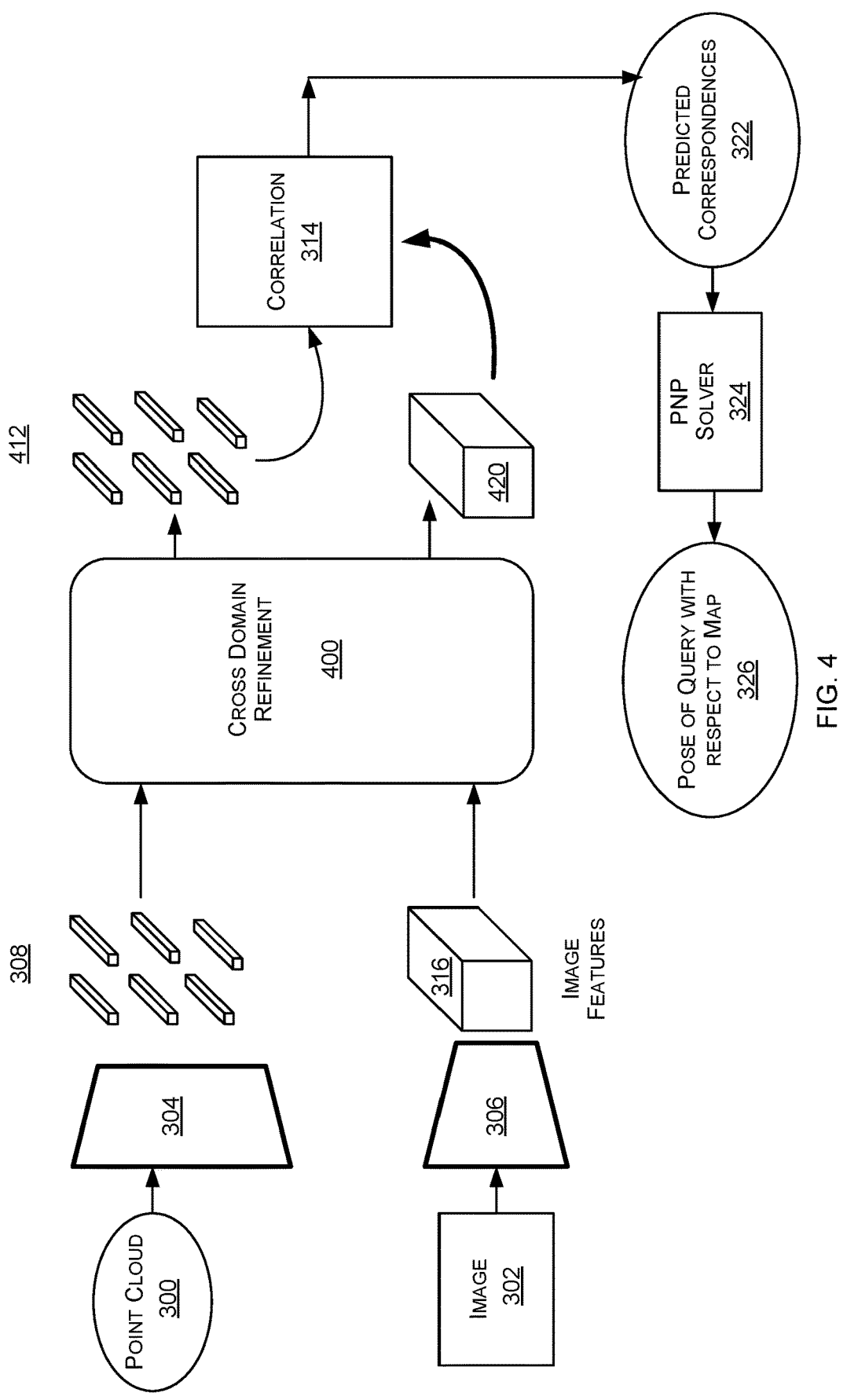
FIG. 4 is a schematic diagram of another example of a localizer.

FIG. 4 is another example of a localizer 122. Here the localizer has a cross-domain refinement module 400 which acts to refine the point cloud descriptors using information from the image descriptors; and acts to refine the image descriptors using information from the point cloud descriptors. The cross-domain refinement module is any process which, prior to the correlating, refines the image descriptors using the point cloud descriptors and refines the point cloud descriptors using the image descriptors. Using a cross-domain refinement module 400 facilitates the correlation process 314 because the point cloud descriptors 308 become similar in nature to the image descriptors 316 despite the fact that these types of descriptors are from different domains. The cross-domain refinement module 400 helps bridge the gap between the 2D and 3D domain from which the different descriptors are extracted, by adding information exchange prior to correlation.

In some examples the cross-domain refinement module is a rule based process which refines the descriptors using statistics of the descriptors in the different domains.

In some examples the cross-domain refinement module is a machine learning model which has been trained as explained in more detail below.

The output from the cross-domain refinement module 400 is refined point cloud descriptors 412 and refined image descriptors 420. The refined descriptors are input to the correlation process 314 in the same way as for FIG. 3 above. As for FIG. 3 the correlation process 314 outputs correspondences 322 which are used by a PnP solver 324 to compute 326 a pose of the query image with respect to the map.

The localizer of FIG. 4 is operable in some embodiments to estimate the 3D position and orientation of an entity from a 3D point cloud captured by the entity. In these embodiments the point cloud 300 has been captured by the entity and the image 302 is an image from the 3D map. That is, the 3D map in these embodiments comprises a plurality of 2D images. The 2D images are posed, that is, for each 2D image a 3D position and orientation of a capture device used to capture the 2D image has been computed. The localizer outputs a pose of the query (which in this case is a 3D point cloud) with respect to the 3D map.

Figure 5:
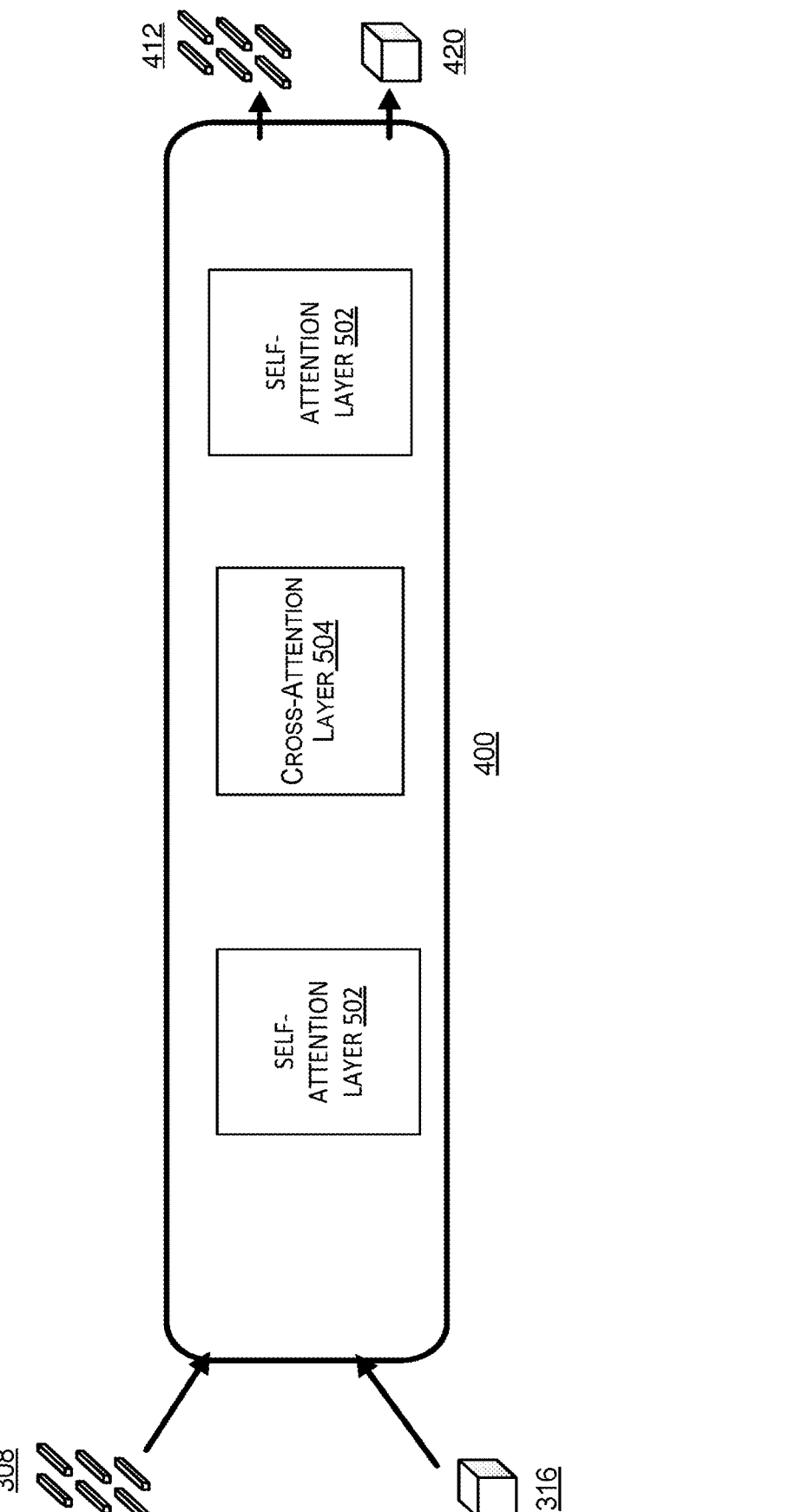
FIG. 5 is a schematic diagram of an example of a cross-domain refinement module.

FIG. 5 is a schematic diagram of an example of a cross-domain refinement module 400 comprising a trained machine learning model having at least one cross-attention layer 504. A cross-attention layer is a layer which has connections between nodes processing point cloud data and nodes processing image data. By using a trained machine learning model rather than a rule-based process improved localization accuracy is given.

In the example of FIG. 5 the cross-domain refinement module 400 comprises using a trained machine learning model having at least one self-attention layer 502 for the image descriptors and at least one other self-attention layer for the point cloud descriptors. Using a self-attention layer enhances context. A self-attention layer has connections between nodes processing data of only one domain. In an example, the cross-domain refinement module 400 comprises a cross-attention layer 504 sandwiched between two self-attention layers 502. Using a sandwich construction in this way is found to give accurate localization performance. In the example of FIG. 5, to enhance the context information within each domain, parallel self-attention layers are applied to the descriptors. This is followed by a cross-attention layer 504, where every descriptor from a domain is refined with descriptors from the other domain. By stacking several blocks of such self or cross-attention layers 504, it is possible to learn more representative descriptors, that lead to significantly better correlation performance.

Figure 6:
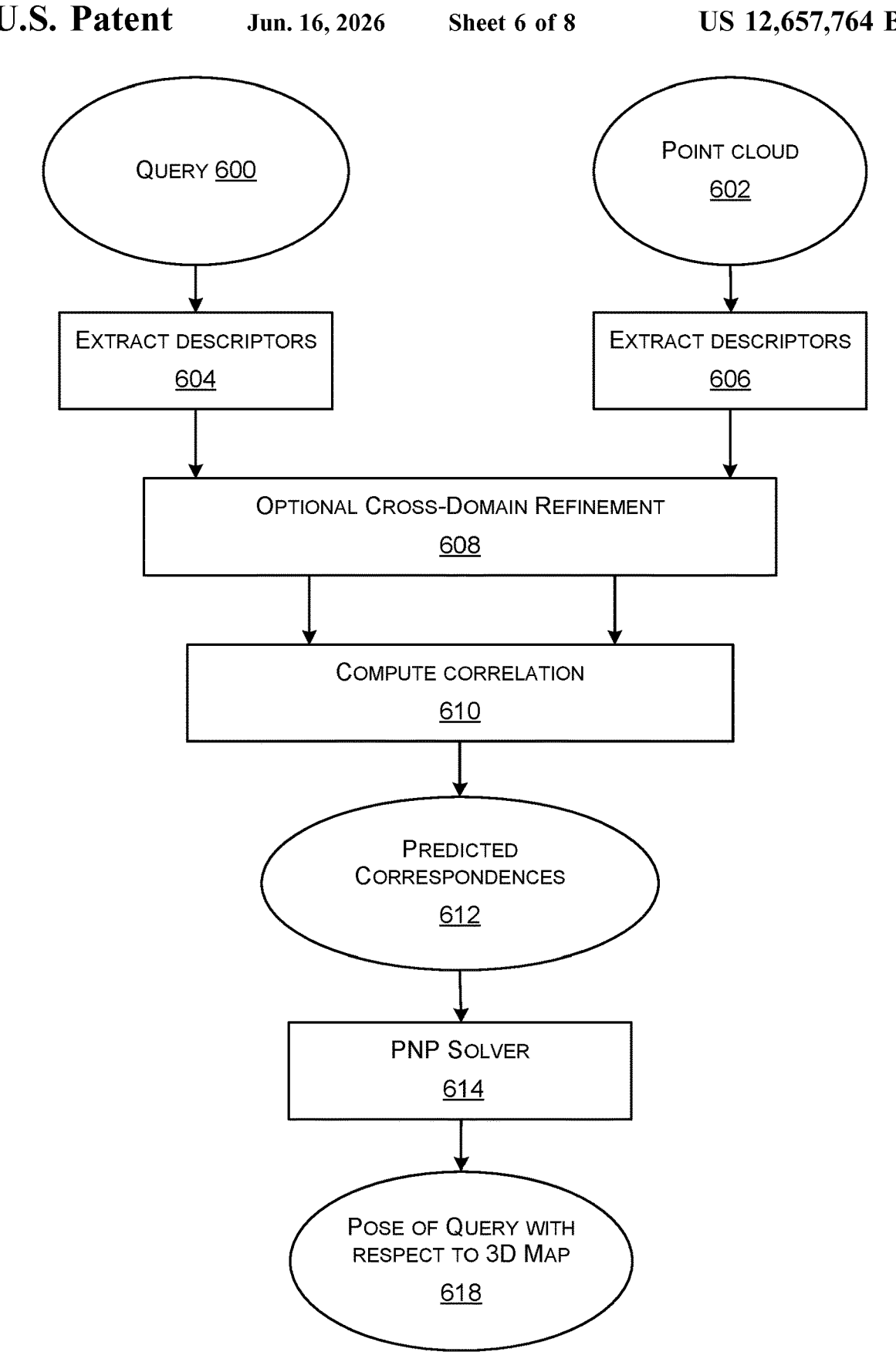
FIG. 6 is a flow diagram of a method performed by a localizer.

FIG. 6 is a flow diagram of a method performed by a localizer such as the localizer 122 of FIG. 1. The localizer receives a query 600 captured by an entity in an environment. The method of FIG. 6 is now described for the case where the query 600 is a 2D image. The localizer also receives a point cloud 602 which is a 3D map or part of a 3D map of the environment.

The localizer extracts 604 descriptors from the query image 600 to produce image descriptors. The localizer extracts 606 descriptors from the point cloud 602 to produce point cloud descriptors.

Where a cross-domain refinement process 608 is used the descriptors are input to the cross-domain refinement process 608 which outputs refined descriptors. The refined descriptors are input to a correlation process for computing 610 a correlation between the image descriptors and the point cloud descriptors. The result of the correlation process is a plurality of predicted correspondences 612 where a correspondence is an image descriptor-point cloud descriptor pair. The correspondences are input to a PnP solver 614 which computes a pose 618 of the query with respect to the 3D map. The pose of the query is equivalent to the pose of the entity.

The method of FIG. 6 is now described for the case where the query 600 is a 3D point cloud such as a 3D scan captured by the entity. The localizer also receives a 3D map 602 of the environment comprising in this case, 2D images, each 2D image having a 3D position and orientation of a capture device used to capture the 2D image.

The localizer extracts 604 descriptors from the query 600 which is a point cloud to produce point cloud descriptors. The localizer extracts 606 descriptors from the 2D images forming the 3D map 602 to produce image descriptors.

Where a cross-domain refinement process 608 is used the descriptors are input to the cross-domain refinement process 608 which outputs refined descriptors. The refined descriptors are input to a correlation process for computing 610 a correlation between the image descriptors and the point cloud descriptors. The result of the correlation process is a plurality of predicted correspondences 612 where a correspondence is an image descriptor-point cloud descriptor pair. The correspondences are used by a PnP solver 614 to compute a pose of the query with respect to the 3D map. The pose of the query is the same as the pose of the entity since the query is a 3D point cloud captured by the entity.

Figure 7:
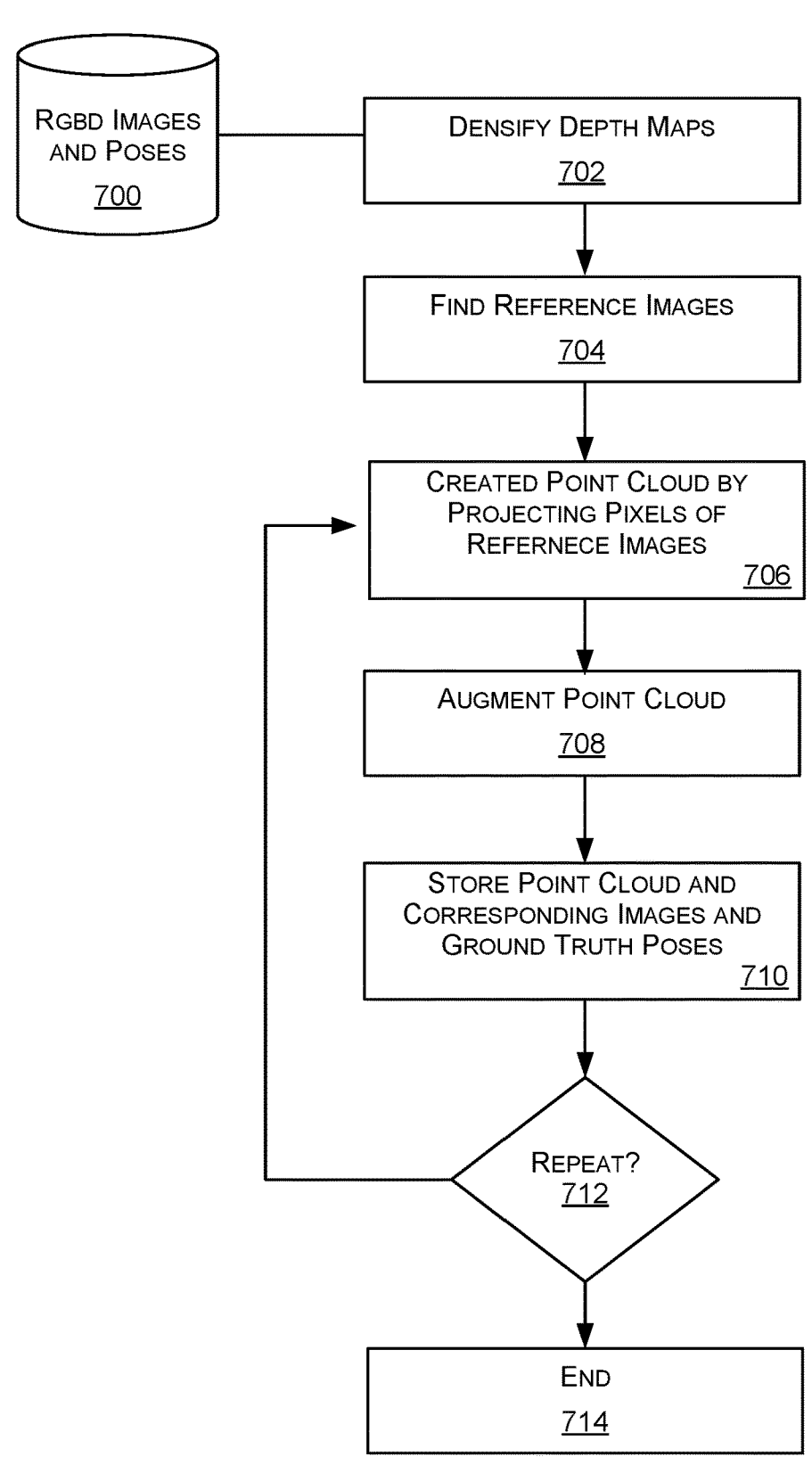
FIG. 7 is a flow diagram of a method of creating training data for training a localizer.

FIG. 7 is a flow diagram of a method of creating training data for training a localizer such as the localizer 122 of FIG. 1. The training data is suitable for training the localizer 122 for both the case where the query is a 2D image and the case where the query is a 3D point cloud. The method accesses a dataset 700 being a store of red green blue depth (RGB-D) images and associated poses. An RGB-D image is an RGB image and a depth image which are captured at generally the same time and from generally the same viewpoint. The depth image is captured using any depth camera such as a time of flight camera, a lidar scanner, a range scanner. The pose associated with an RGB-D image is the position and orientation of the RGB camera and depth camera used to capture the RGB-D image. The RGB-D images depict environments in which entities are to be localized such as hundreds of different rooms and hundreds of outdoor landmarks across the world. The depth maps are optionally densified using conventional multi-view stereo processing.

The process selects (at random or in any other way) one of the RGB-D images as a query image. For each query image, the process finds 704 a plurality of covisible images, which are referred to as reference images. Covisible images are images which depict the same environment or at least part of the same environment. Thus covisible images are likely to have been captured from capture devices with similar poses to the query image.

To create 706 a point cloud the method projects pixel points of the reference images with valid depth to 3D and transforms them to a world coordinate system. To assess whether a pixel point has valid depth, the depth value from the depth image of the RGB-D image is taken and compared with at least one threshold which is defined empirically or set by an operator. The ground-truth poses provided by the original RGB-D datasets are transformed to the world coordinate system as well. The ground-truth transformation relating the world coordinate system to that of the query is retrieved from the dataset 700.

The point-cloud is augmented 708 with one or more of: rotation, random scaling, random noise, random erase, shuffling, random brightness scaling, random Gaussian blur. In some examples, for compatibility with realistic scenarios, and where the gravity direction is known (such as from an accelerometer in the capture device) rotations are only applied in plane, or only about axes generally parallel to the gravity direction. Where transformations are made, the ground-truth poses relating the point-cloud to the image are updated accordingly.

A check is made at decision point 712 whether to repeat the method to generate another training data example. The decision is made using criteria such as a threshold number of training data examples, or an amount of storage capacity available. If the method repeats to generate another training data example, another query image is selected from the dataset 700 and the process repeats from operation 704. If check point 712 determines that the method is not to repeat the process ends 714. The resulting generated training dataset is stored and contains point-clouds and corresponding images, along with the ground-truth poses relating them.

The training dataset is used to train a localizer such as localizer 122 of FIG. 1 using supervised learning. The resulting localizer is usable for both the situation where the query is a 2D image and the situation where the query is a 3D point cloud. A training data item is taken from the training dataset. It comprises a point cloud and a query image as well as a ground truth pose relating the two. The point cloud and the query image are input to the extractors to extract descriptors as explained with reference to FIG. 3 and FIG. 4. The descriptors are correlated (after first having been processed by cross-domain refinement if applicable). Correspondences from the correlation process are predicted. The predicted correspondences are compared with ground truth correspondences using a loss function. The results of the loss function are used to update parameters of any machine learning models in the localizer 122. This process repeats for another training data item and continues to repeat for more training data items until convergence is reached. Convergence is when the amount of update of the parameters is de minimis or when a specified number of training data items have been used.

In an example the loss function is a focal loss. A focal loss is a cross entropy loss with a modulating term in order to focus learning on training examples which produce poor predictions. The cross entropy loss is dynamically scaled such as by using a scaling factor which falls to zero as confidence in the prediction improves. In an example a focal loss is used which is defined as follows:

$$\mathcal{L} = \sum_{(k,l) \in M} - a \cdot \left(1 - \hat{Z}_{kl}\right)^{\gamma} \cdot \log\left(\hat{Z}_{kl}\right),$$

Which is expressed in words as, the loss L is equal to the sum over correspondences of a negative learning rate $-\alpha$ times one minus a predicted correspondence to the power of a scaling factor $\gamma$, times the logarithm of the predicted correspondence. The values of the learning rate and the scaling factor $\gamma$ are determined empirically or set by an operator. The inventors have found empirically that using a focal loss gives particularly accurate performance of the localizer 122.

Other loss functions are used in other examples. A non-exhaustive list of possible loss functions is: cross-entropy loss, circle loss, triplet loss, contrastive loss, expected predicted error (EPE) loss.

With the training dataset generation pipeline of FIG. 7, it is possible to generate two query images and a point-cloud, along with their ground-truth poses. This allows to jointly supervise the network predictions between the same point-cloud and two different images. This is beneficial since it enforces the learnt point-cloud features to be robust to different camera view-points simultaneously. In an example the training data is computed from RGB-D images by, selecting two of the RGB-D images as query images, finding a plurality of reference images being other ones of the RGB-D images which are covisible with either of the query images, projecting pixels of the reference images to 3D to form a single point cloud, and storing the query images and point cloud as a training data item.

Moreover, in this set-up, it is possible to jointly train the localizer 122 along with a standard 2D-2D matching network. By sharing the extractor for the image descriptors across the localizer 122 and the 2D-2D matching network, the performance of the localizer 122 significantly improves.

The technology has been tested empirically and found to work well for smaller scenes such as the publicly available 7 scenes dataset and the publicly available ScanNet dataset. In the case of the 7 scenes dataset and where the localizer was deployed as now described, the media pose error was 9.15 centimeters and 3.04 degrees.

During the empirical testing assume a query image $I \in \mathbb{R}^{H \times W \times 3}$ and a point-cloud $P=\{p_j \in \mathbb{R}^3 | j=1, \ldots, N\}$. The point-cloud can optionally be associated with additional information, such as its color, lidar intensity, etc. Let $q_i$ denote the pixel position at index $i \in \{1, \ldots, HW\}$ in a flattened version of image I. A goal is to predict the set of index pairs i and j, for which the j-th 3D point $p_j$ projects to the image plane at the pixel coordinate specified by the corresponding i-th index, i.e. seek the matching set $\hat{M}=\{(j, i) | q_i=\pi(p_j, K, R, t)\}$. Here, $K \in \mathbb{R}^{3 \times 3}$ corresponds to the intrinsic matrix of the camera and is assumed to be known. $R \in SO(3)$ and $t \in \mathbb{R}^3$ are respectively the ground-truth 3D rotation matrix and 3D translation vector relating the coordinate system of the point-cloud to that of the camera. The operator $\pi(\bullet)$ represents the camera projection function, which transforms 3D points onto the coordinate system of the camera and projects them to the image plane according to the camera intrinsic parameters. The set of predicted matches $\hat{M}$ can then be used to estimate the query image pose $\hat{T}=\{\hat{R},\hat{t}\}$ using a PnP solver.

The architecture of the localizer which gave the empirical results listed above takes as input the query I and the point-cloud P, along with any additional information that might be available (color, lidar intensity, other).

A point-cloud encoder backbone $\emptyset_P$ (such as a neural network) is used to extract features for the point-cloud. A by-product of the point feature learning is point down-sampling. Work on down-sampled point-clouds since pose estimation can be accurate with correspondences of a much coarser subset of points. Moreover, the original point-clouds are usually too dense such that pointwise correspondences are redundant and sometimes too clustered to be useful. The points corresponding to the coarsest resolution are denoted as $\overline{P}=\{\overline{p}_k \in \mathbb{R}^3 | k=1, \ldots, M; M \ll N\}$. The point-cloud backbone predicts the features associated to the coarse points $\overline{F}^P=\emptyset_p(P) \in \mathbb{R}^{M \times d}$.

In parallel, an image encoder backbone $\Phi_I$ (which may be a neural network) processes the input image I and predicts a coarse image feature map $F^I=\emptyset_I(I) \in \mathbb{R}^{H/8 \times W/8 \times d}$. As before, let $$F_k^I \in \mathbb{R}^D$$

denote the feature vector at a flattened spatial location k.

Both sets of features $\overline{F}^P$ and $F^I$ are fed to a multi layer perceptron (MLP) and a convolutional neural network (CNN) respectively. To alleviate the domain gap between point-cloud and image features, introduce a cross-domain refinement module. It predicts refined features $\tilde{F}^P$ and $\tilde{F}^I$, that encode cross-domain information.

These features are then densely correlated, leading to the output cost volume $\hat{C} \in \mathbb{R}^{M \times H/8 \cdot W/8}$. Computed as dense scalar products $$\hat{C}_{kl} = \left(\tilde{F}_k^P\right)^T \tilde{F}_l^I,$$

it encodes the deep feature similarity between pairs of coarse point-cloud and image locations. Convert $\hat{C}$ into a soft assignment matrix $\hat{Z}$ by applying the softmax operator over the flattened image dimension. Each row $\hat{Z}_k \in \mathbb{R}^{H/8 W/8}$ can be seen as the predicted probability distribution of where point, $\overline{p}_k$ projects in image I. Each entry of $\hat{Z}$ encodes the predicted confidence of the candidate matches. Then extract the predicted correspondences $\hat{M}$ via. mutual top-$\beta$ selection, where a match (j,i) is selected if it is among the $\beta$ largest entries of both the row and the column that it resides in, and if its corresponding confidence $\hat{Z}_{ji}$ is above a certain threshold $\eta$.

Figure 8:
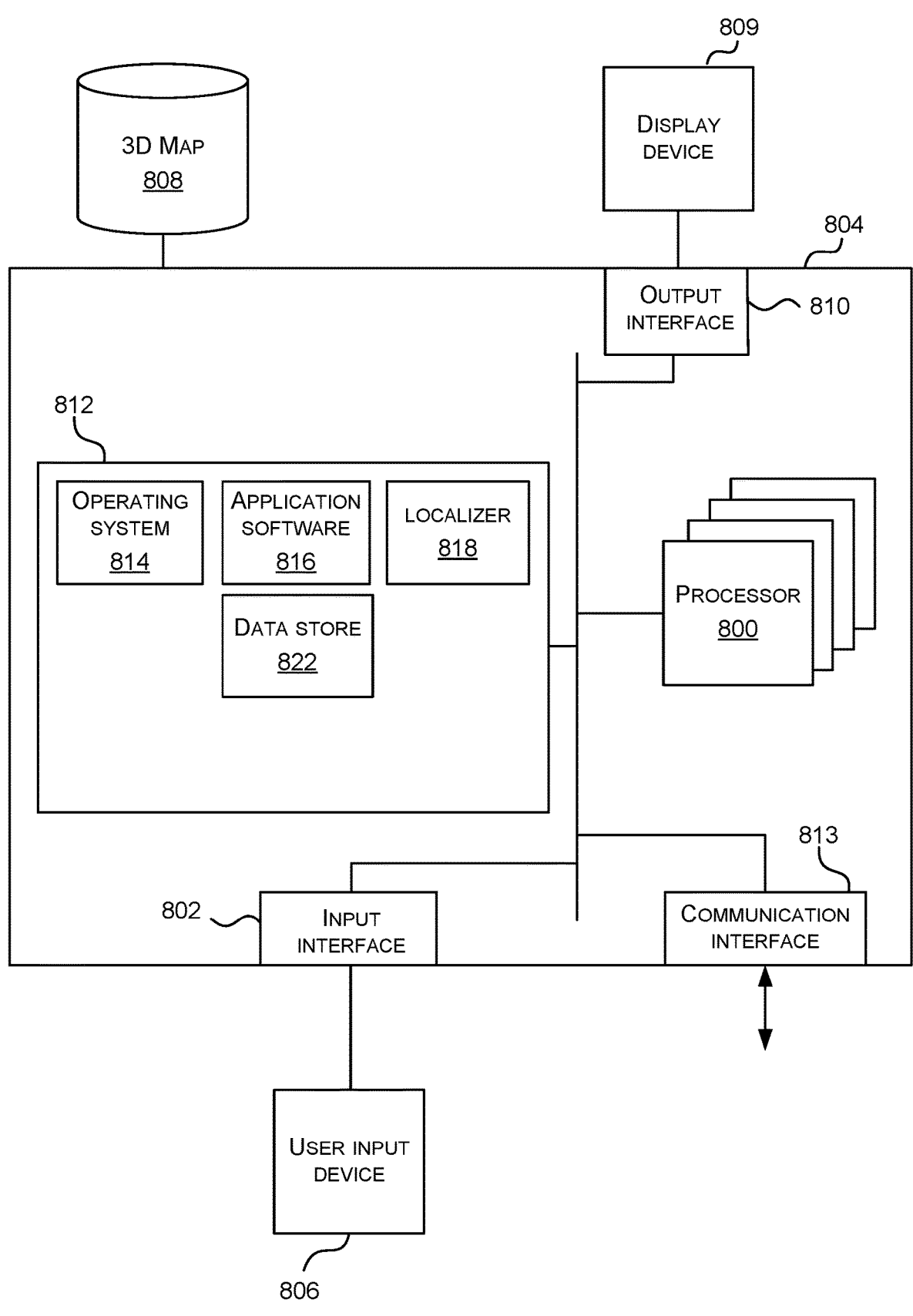
FIG. 8 illustrates an exemplary computing-based device in which embodiments of a localizer are implemented.

FIG. 8 illustrates an exemplary computing-based device in which example localization functionality is implemented, for computing a pose of an entity with respect to a 3D map where the 3D map comprises a point cloud which has not been formed from 2D images and does not have stored 2D images.

Computing-based device 804 comprises one or more processors 800 which are microprocessors, controllers or any other suitable type of processors for processing computer executable instructions to control the operation of the device in order to localize an entity with respect to a 3D map. In some examples, for example where a system on a chip architecture is used, the processors 800 include one or more fixed function blocks (also referred to as accelerators) which implement a part of the method of FIG. 6, or FIG. 7 in hardware (rather than software or firmware). Platform software comprising an operating system 814 or any other suitable platform software is provided at the computing-based device to enable application software 816 to be executed on the device. Other software that is executable on the computing device 804 comprises: localizer 818 for finding a 3D map pose within associated 3D map 808 from features derived from sensor data. Data store 822 is provided to store such data as user configurable parameters, poses, sensor data, or other data.

The computer executable instructions are provided using any computer-readable media that is accessible by computing based device 804. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, optical storage, magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 804 it will be appreciated that the storage is, in some examples, distributed or located remotely and accessed via a network or other communication link (e.g. using communication interface 813).

The computing-based device 804 also comprises an output interface 810 arranged to output display information to a display device 809 which may be separate from or integral to the computing-based device 804. The display information may provide a graphical user interface. The computing-based device 804 also comprises an input interface 802 arranged to receive and process input from one or more devices, such as a user input device 806 (e.g. a mouse, keyboard, camera, microphone, global positioning system or other sensor). In some examples the user input device 806 detects voice input, user gestures or other user actions and provides a natural user interface (NUI). In an embodiment the display device 809 also acts as the user input device 806 if it is a touch sensitive display device. The output interface 810 outputs data to devices other than the display device in some examples.

Alternatively, or in addition to the other examples described herein, examples include any combination of the following:

Clause A A method of determining a 3D position and orientation of an entity comprising:

receiving a query comprising a 2D image depicting an environment of the entity;

searching for a match between the query and a 3D map of the environment, the 3D map comprising a 3D point cloud;

wherein searching for the match comprises:

extracting descriptors from the 3D point cloud referred to as point cloud descriptors;

extracting descriptors from the 2D image referred to as image descriptors;

correlating the image descriptors with the point cloud descriptors to produce correspondences, wherein a correspondence is an image descriptor corresponding to a point cloud descriptor;

estimating, using the correspondences, the 3D position and orientation of the entity with respect to the 3D map.

Clause B The method of clause A wherein the estimate of the 3D position and orientation of the entity is a relative pose between the entity and the 3D map of the environment.

Clause C The method of any preceding clause comprising, prior to the correlating, refining the image descriptors using the point cloud descriptors and refining the point cloud descriptors using the image descriptors.

Clause D The method of clause C wherein the refining comprises using a trained machine learning model having at least one cross-attention layer.

Clause E The method of clause C or clause D wherein the refining comprises using a trained machine learning model having at least one self-attention layer for the image descriptors and at least one other self-attention layer for the point cloud descriptors.

Clause F The method of any preceding clause wherein the correlating comprises computing similarity between point cloud descriptors and image descriptors.

Clause G The method of any preceding clause wherein extracting the image descriptors is done using a machine learning model and wherein extracting the point cloud descriptors is done using a machine learning model.

Clause H An apparatus comprising:

at least one processor (714);

a memory (712) storing instructions that, when executed by the at least one processor (714), perform a method of determining a 3D position and orientation of an entity comprising:

receiving a query comprising a 2D image depicting an environment of the entity;

searching for a match between the query and a 3D map of the environment, the 3D map comprising a 3D point cloud;

wherein searching for the match comprises:

extracting descriptors from the 2D image referred to as image descriptors;

extracting descriptors from the 3D point cloud referred to as point cloud descriptors;

correlating the image descriptors with the point cloud descriptors to produce correspondences, wherein a correspondence is an image descriptor corresponding to a point cloud descriptor;

estimating, using the correspondences, the 3D position and orientation of the entity with respect to the 3D map.

Clause I The apparatus of clause H comprising a machine learning model, arranged to, prior to the correlating, refine the image descriptors using the point cloud descriptors and, refine the point cloud descriptors using the image descriptors.

Clause J The apparatus of clause I wherein the machine learning model has been trained using training data comprising pairs, each pair being a point cloud and a corresponding image.

Clause K The apparatus of clause J wherein ground truth poses of the training data pairs are known.

Clause L The apparatus of clause I or J wherein the training data is computed from RGB-D images by, selecting one of the RGB-D images as a query image, finding a plurality of reference images being other ones of the RGB-D images which are covisible with the query image, projecting pixels of the reference images to 3D to form a point cloud, and storing the query image and point cloud as a training data item.

Clause M The apparatus of clause L wherein the training data is computed by augmenting the point cloud with at least one of: rotation, scaling, noise.

Clause N The apparatus of clause L or M wherein the training data is computed by applying rotation taking into account a gravity direction.

Clause O The apparatus of clause N wherein ground truth poses relating the point cloud to the image are modified according to the rotation.

Clause P The apparatus of any of clauses I to O wherein the machine learning model is trained using a training loss being a focal loss.

Clause Q The apparatus of any of clauses J to N wherein the processor has instructions to compute the training data from RGB-D images by, selecting two of the RGB-D images as query images, finding a plurality of reference images being other ones of the RGB-D images which are covisible with either of the query images, projecting pixels of the reference images to 3D to form a single point cloud, and storing the query images and point cloud as a training data item.

Clause R The apparatus of clause Q comprising a 2D-2D matching network which shares a component for extracting the descriptors from a image.

Clause S The apparatus of clause R wherein the 2D-2D matching network has been trained as part of the process of training the machine learning model.

Clause T A method of determining a 3D position and orientation of an entity comprising:

receiving a query comprising a 3D point cloud depicting an environment of the entity;

searching for a match between the query and a 3D map of the environment, the 3D map comprising 2D images;

wherein searching for the match comprises:

extracting descriptors from the 3D point cloud referred to as point cloud descriptors;

extracting descriptors from the 2D images referred to as image descriptors;

correlating the image descriptors with the point cloud descriptors to produce correspondences, wherein a correspondence is an image descriptor corresponding to a point cloud descriptor;

estimating, using the correspondences, the position and orientation of the entity with respect to the 3D map.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method of determining a pose of an entity, the pose comprising a 3D position and orientation of the entity, the method comprising:

receiving a query comprising a single 2D image depicting an environment of the entity; and searching for a match between the query and a 3D map of the environment, the 3D map comprising a 3D point cloud omitting visual imagery of the environment, searching for the match further comprising:

predicting a coarse image feature map comprising a feature vector at a flattened spatial location;

down-sampling the 3D point cloud to a coarsest resolution to reduce one or more of: a pointwise correspondence density, a correspondence clustering, and redundant correspondence of the 3D point cloud;

extracting an image descriptor from the single 2D image, the image descriptor based on the predicted coarse image feature map;

extracting a point cloud descriptor from the down-sampled 3D point cloud;

using the single 2D image, directly localizing the entity with respect to the 3D map, directly localizing comprising:

correlating the image descriptor with the point cloud descriptor to produce a correspondence, the correspondence being a pair comprising the image descriptor and the point cloud descriptor, the pair having a numerical similarity value above a threshold representing a likelihood that the pair is depicting a same element of the environment; and estimating, using the correspondence, the pose of the entity with respect to the 3D map.

2. The method of claim 1 wherein the estimated pose of the entity is a relative pose between the entity and the 3D map of the environment.

3. The method of claim 1 comprising, prior to the correlating, refining the image descriptor using the point cloud descriptor and refining the point cloud descriptor using the image descriptor, refining the image descriptor and refining the point cloud descriptor facilitating the correlating by making the image descriptor similar to the point cloud descriptor.

4. The method of claim 3 wherein the refining comprises using a trained machine learning model having a cross-attention layer.

5. The method of claim 4 wherein the refining comprises using a trained machine learning model having a first self-attention layer for the image descriptor and a second self-attention layer for the point cloud descriptor.

6. The method of claim 1 wherein the correlating comprises computing similarity between point cloud descriptor and image descriptor.

7. The method of claim 1 wherein:

extracting the image descriptor is done using a machine learning model, and extracting the point cloud descriptor is done using a machine learning model;

omitting visual imagery of the environment further comprises increasing a security of the single 2D image and securing the direct localization of the entity; and correlating the image descriptor with the point cloud descriptor to produce a correspondence further comprises:

computing an output cost volume as dense scalar products, the output cost volume encoding a deep feature similarity between a coarse point-cloud location and a coarse image feature map location;

converting the output cost volume into a soft assignment matrix by applying a softmax operator over a flattened image dimension, a row of the soft assignment matrix being a predicted probability distribution of where a point on the 3D point cloud projects in the single 2D image, and an entry of the soft assignment matrix encoding a predicted confidence of a candidate match;

extracting a predicted correspondence using mutual top-$\beta$ selection; and selecting the candidate match as a match when:

the candidate match is among a $\beta$ largest entries of the row and a column of the soft assignment matrix where the candidate match is located, and a corresponding confidence of the candidate match is above the threshold.

8. An apparatus comprising:

a processor;

a memory storing instructions that, when executed by the processor, perform a method of determining a pose of an entity, the pose comprising a 3D position and orientation of the entity, the method comprising:

receiving a query comprising a single 2D image depicting an environment of the entity; and searching for a match between the query and a 3D map of the environment, the 3D map comprising a 3D point cloud omitting visual imagery of the environment, searching for the match further comprising:

predicting a coarse image feature map comprising a feature vector at a flattened spatial location;

down-sampling the 3D point cloud to a coarsest resolution to reduce one or more of: a pointwise correspondence density, reduce a correspondence clustering, and reduce a redundant correspondence;

extracting an image descriptor from the single 2D image;

extracting a point cloud descriptor from the 3D point cloud;

using the single 2D image, directly localizing the entity with respect to the 3D map, directly localizing comprising:

correlating the image descriptor with the point cloud descriptor to produce a correspondence, the correspondence being a pair comprising the image descriptor and the point cloud descriptor, the pair having a numerical similarity value above a threshold representing a likelihood that the pair is depicting a same element of the environment; and estimating, using the correspondence, the pose of the entity with respect to the 3D map.

9. The apparatus of claim 8 comprising a machine learning model configured to, prior to the correlating, refine image descriptor using the point cloud descriptor and, refine the point cloud descriptor using the image descriptor, refining the image descriptor and refining the point cloud descriptor facilitating the correlating by making the image descriptor similar to the point cloud descriptor.

10. The apparatus of claim 9 wherein the machine learning model has been trained using training data comprising a plurality of pairs, a pair of the plurality of pairs comprising a point cloud and a corresponding image.

11. The apparatus of claim 10 wherein a ground truth pose of the pair of the plurality of pairs is known.

12. The apparatus of claim 10 wherein the training data is computed from an RGB-D image of a plurality of RGB-D images by:

selecting the RGB-D image as a query image, finding a plurality of reference images distinct from the query image in the plurality of RGB-D images which are covisible with the query image, and projecting a plurality of pixels of the plurality of reference images to 3D to form the point cloud, and storing the query image and the point cloud as a training data item.

13. The apparatus of claim 12 wherein the training data is computed by augmenting the point cloud with at least one of: rotation, scaling, or noise.

14. The apparatus of claim 12 wherein computing the training data further comprises applying a rotation, the rotation accounting for a gravity direction.

15. The apparatus of claim 14 wherein a ground truth pose relating the point cloud to the image is modified according to the rotation.

16. The apparatus of claim 10 wherein the processor executes further instructions stored in the memory, further comprising: computing the training data from a plurality of RGB-D images by:

selecting a first RGB-D image and a second RGB-D image of the plurality of RGB-D images as a first query image and a second query image, finding a plurality of reference images distinct from the first query image and the second query image in the plurality of RGB-D images which are covisible with first query image or the second query image, projecting a plurality of pixels of the plurality of reference images to 3D to form a single point cloud, and storing the first query image and the second query image and the single point cloud as a training data item.

17. The apparatus of claim 16 further comprising a 2D-2D matching network which shares a component for extracting the image descriptor from the single 2D image.

18. The apparatus of claim 17 wherein training the machine learning model further comprises training the 2D-2D matching network.

19. The apparatus of claim 9 wherein the machine learning model is trained using a training loss being a focal loss.

20. A computer program embodied on a non-transitory computer-readable storage and configured to, when executed on a processor, perform a method to determine a pose of an entity, the pose comprising a 3D position and orientation of the entity, the method comprising:

receiving a query comprising a single 2D image depicting an environment of the entity; and searching for a match between the query and a 3D map of the environment, the 3D map comprising a 3D point cloud omitting visual imagery of the environment, searching for the match further comprising:

predicting a coarse image feature map comprising a feature vector at a flattened spatial location;

down-sampling the 3D point cloud to a coarsest resolution to reduce one or more of: a pointwise correspondence density, a correspondence clustering, and redundant correspondence of the 3D point cloud;

extracting an image descriptor from the single 2D image, the image descriptor based on the predicted coarse image feature map;

extracting a point cloud descriptor from the down-sampled 3D point cloud;

using the single 2D image, directly localizing the entity with respect to the 3D map, directly localizing comprising:

refining the image descriptor or the point cloud descriptor using a trained machine learning model having a cross-attention layer, correlating the image descriptor with the point cloud descriptor to produce a correspondence, the correspondence being a pair comprising the image descriptor and the point cloud descriptor, the pair having a numerical similarity value above a threshold representing a likelihood that the pair is depicting a same element of the environment; and estimating, using the correspondence, the pose of the entity with respect to the 3D map.

* * * * *